May 12, 1959 T. J. CRAWFORD 2,886,690
METHOD AND APPARATUS FOR INDUCTION BRAZING OF METAL TUBING
Filed Feb. 28, 1955 4 Sheets-Sheet 1
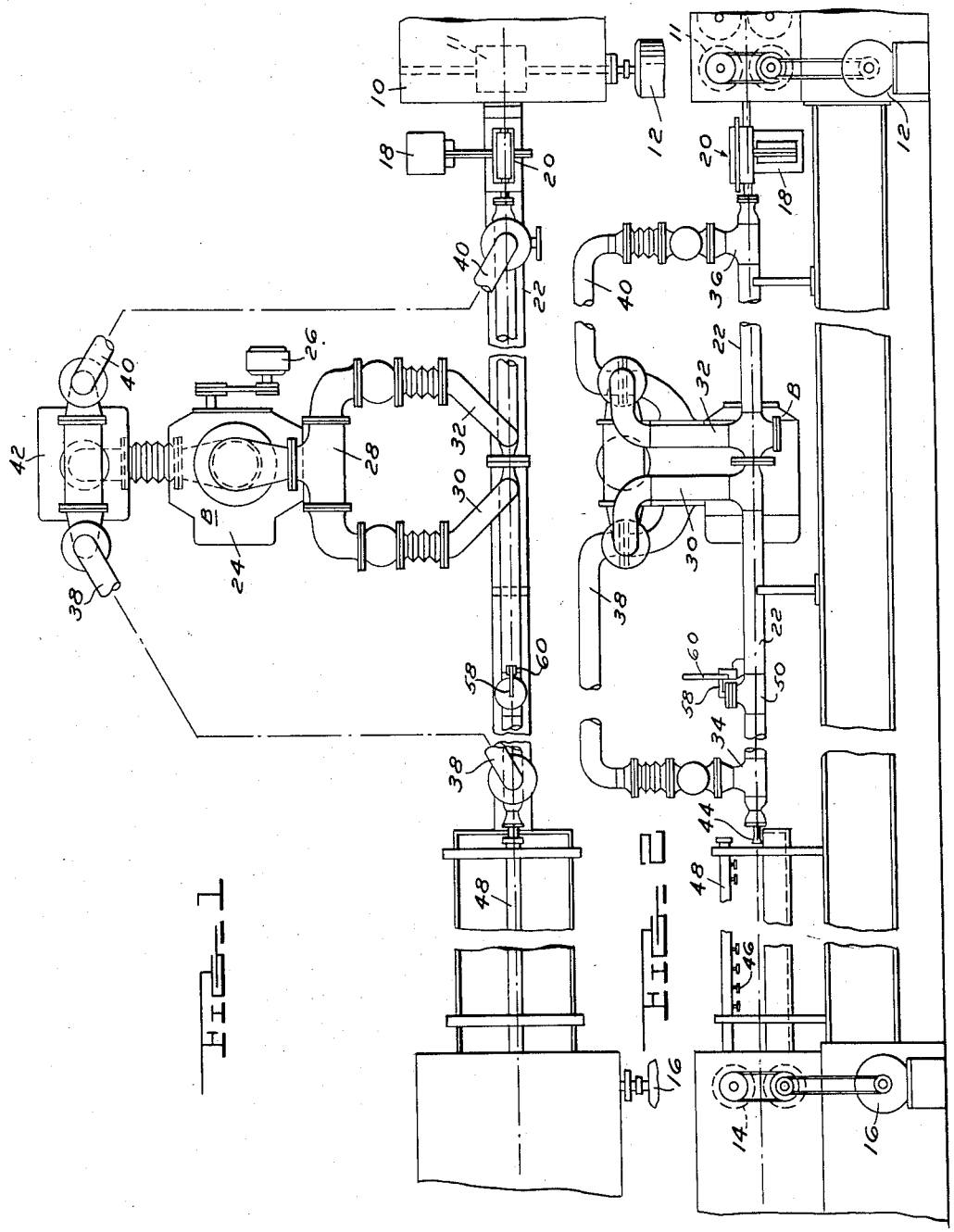
INVENTOR
THOMAS J. CRAWFORD
BY Whittemore,
Hulbert & Belknap
ATTORNEYS May 12, 1959   T. J. CRAWFORD   2,886,690
METHOD AND APPARATUS FOR INDUCTION BRAZING OF METAL TUBING
Filed Feb. 28, 1955   4 Sheets-Sheet 2
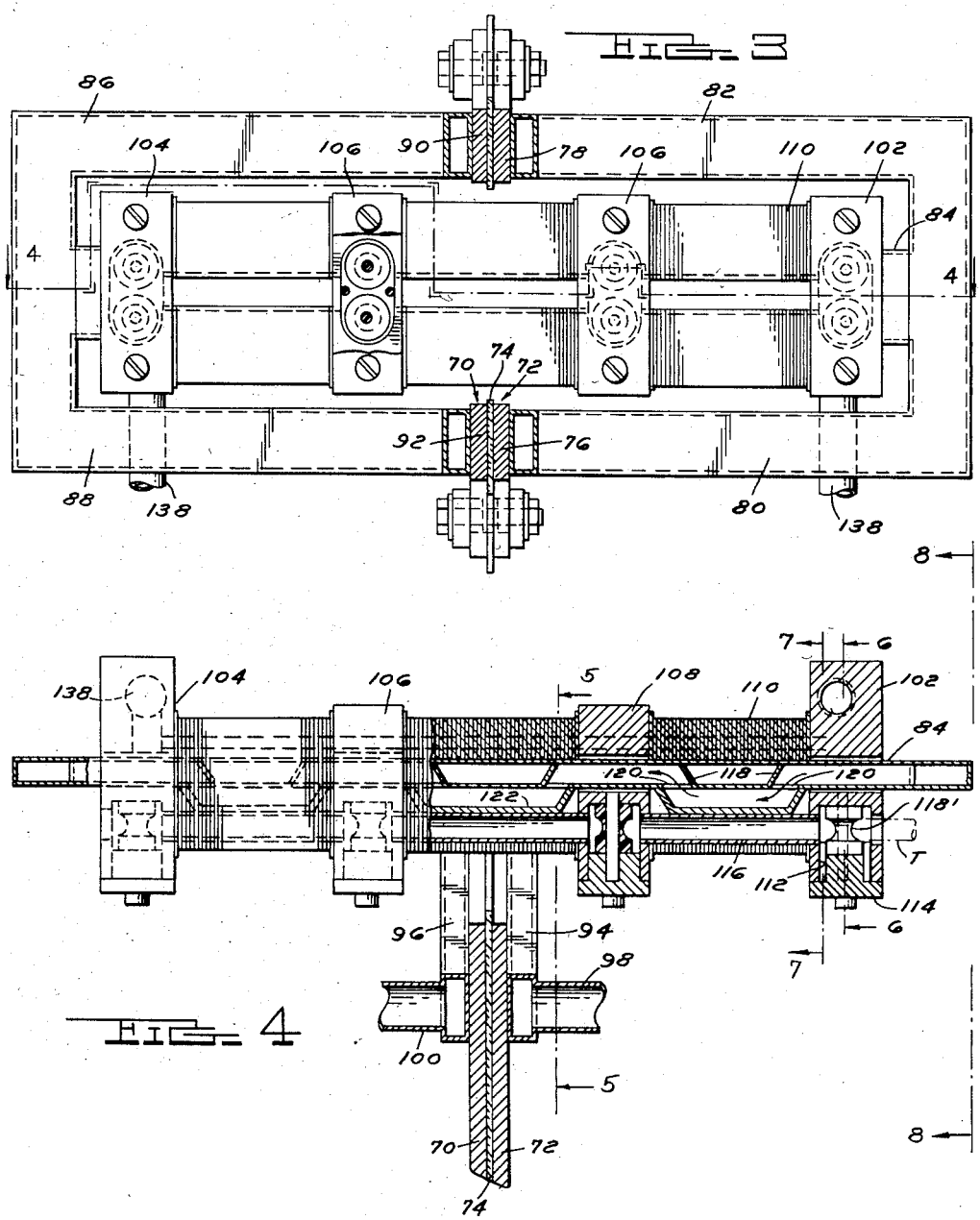
INVENTOR.
THOMAS J. CRAWFORD
BY Whittemore,
Hulbert & Belknap
ATTORNEYS

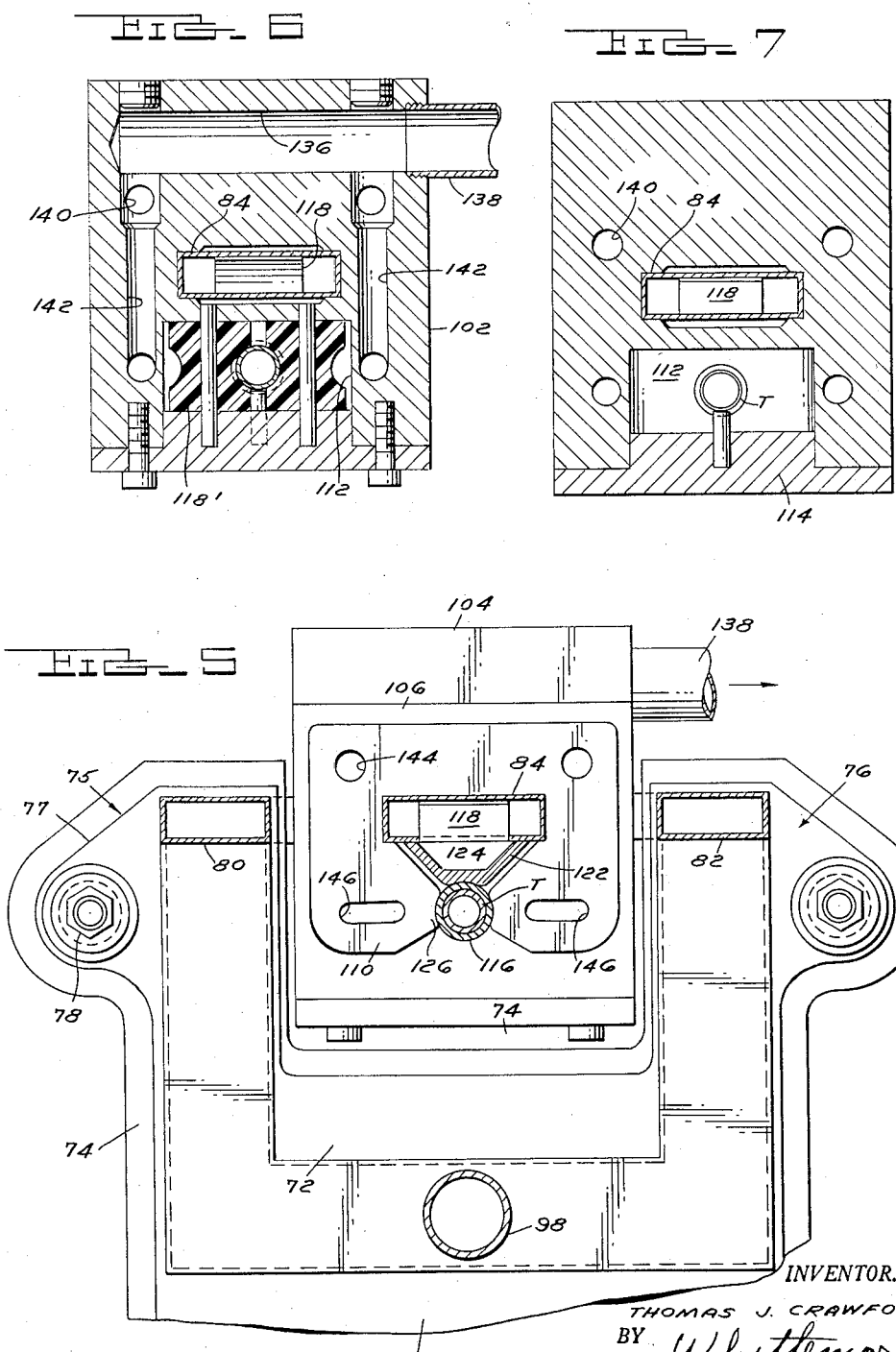

May 12, 1959 T. J. CRAWFORD 2,886,690
METHOD AND APPARATUS FOR INDUCTION BRAZING OF METAL TUBING
Filed Feb. 28, 1955 4 Sheets-Sheet 4
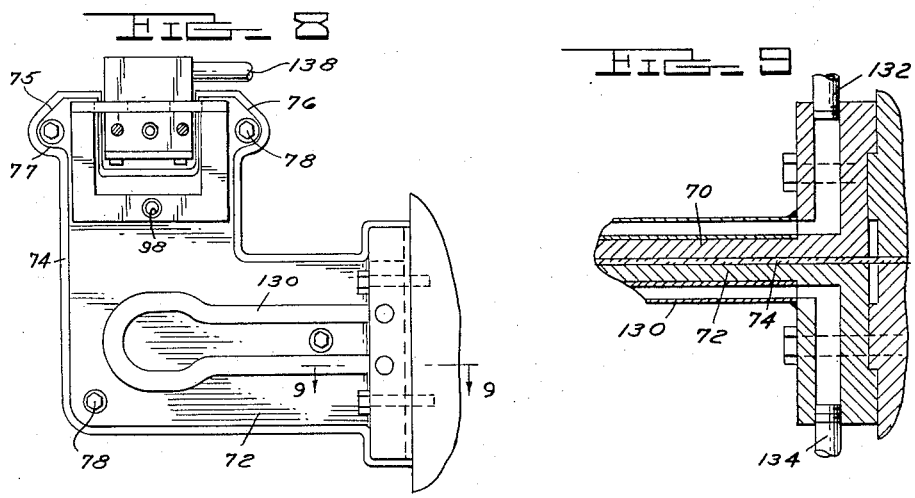
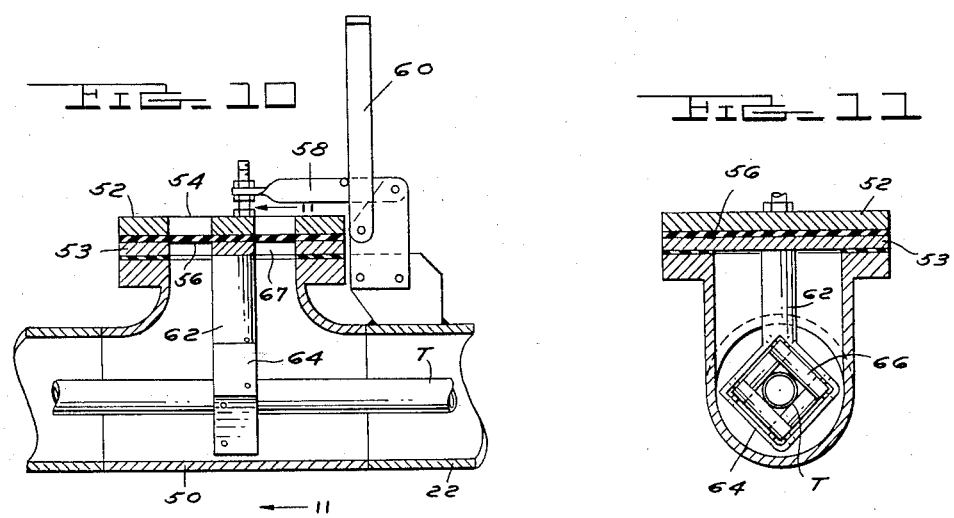
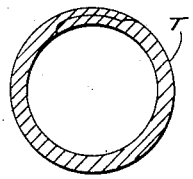
INVENTOR.
THOMAS J. CRAWFORD
BY
ATTORNEYS

United States Patent Office 2,886,690
Patented May 12, 1959

2,886,690

METHOD AND APPARATUS FOR INDUCTION BRAZING OF METAL TUBING

Thomas J. Crawford, Berkley, Mich.

Application February 28, 1955, Serial No. 490,823

7 Claims. (Cl. 219—67)

The present invention relates to method and apparatus for induction brazing metal tubing.

It is an object of the present invention to provide a method and apparatus for effecting the brazing of metal tubing characterized by the rapidity with which the shaped tubing is brought to brazing temperature, and the rapidity with which it is thereafter cooled to a non-reactive temperature so that the operation may be carried out in a continuous manner in straight line procedure without requiring excessive length.

More specifically, it is an object of the present invention to provide induction heating apparatus for bringing shaped tubing to brazing temperature in a very short space while being advanced at a relatively high speed.

It is a further object of the present invention to provide a method and apparatus for cooling brazed metal tubing from brazing temperature to a temperature at which it is non-reactive with the atmosphere in a relatively short time.

Still more specifically, it is an object of the present invention to provide method and apparatus for cooling brazed metal tube from brazing temperature to non-reactive temperature by subjecting it to a very high velocity turbulent flow of cool gas.

It is a further object of the present invention to provide method and apparatus for brazing metal tube characterized by the method and means of concentrating eddy currents in the portion of the tube where the brazed seam is located.

Other objects and features of the invention will become apparent as the description proceeds, especially when taken in conjunction with the accompanying drawings, wherein:

Figure 1 is a plan view with parts broken away, of the apparatus for brazing and then cooling metal tubing.

Figure 2 is a side elevational view partly broken away, of the apparatus shown in Figure 1.

Figure 3 is an enlarged plan view of the inductor with parts broken away.

Figure 4 is a fragmentary vertical sectional view through the inductor, taken on the line 4—4, Figure 3.

Figure 5 is an enlarged fragmentary view of the inductor taken on the line 5—5, Figure 4.

Figure 6 is an enlarged sectional view on the line 6—6, Figure 4.

Figure 7 is an enlarged sectional view on the line 7—7, Figure 4.

Figure 8 is an elevational view looking in the direction of the arrows 8—8, Figure 4, on a smaller scale.

Figure 9 is a fragmentary section on the line 9—9, Figure 8.

Figure 10 is an enlarged vertical sectional view taken longitudinally of the pipe through which the tubing is advanced during cooling.

Figure 11 is a sectional view on the line 11—11, Figure 10.

Figure 12 is a transverse sectional view through typical tubing produced by the present method and apparatus.

In accordance with the present invention metal tubing is produced in a continuous process by apparatus which forms strip into tubular configuration and simultaneously shapes the edges to produce the required shape. In a preferred practice of the invention the tubing is formed from copper coated steel and the shaping is carried out in a continuous manner in a set of forming rolls. In this way the formed tubing leaves the rolls with edge portions in abutment and suitable for effecting a brazed joint thereat upon being raised to the requisite temperature. In order to make the operation efficient it is necessary to provide means for bringing the formed tubing to brazing temperature rapidly and in the present invention this is accomplished by induction heat wherein the zone of the formed tubing containing the joint to be brazed is brought to a relatively higher temperature than the remainder of the formed tubing. In order to preserve the appearance of the finished brazed tube and to prevent oxidation or discoloration of the copper coating, it is essential that the tubing be protected from the atmosphere until it has been reduced to a temperature at which it is non-reactive with the atmosphere. Such a temperature may be considered to be about 1000 degrees Fahrenheit.

In accordance with the present invention the temperature of the brazed tubing is reduced from the brazing temperature as it is advanced rapidly through a continuous pipe by subjecting it to high velocity turbulent flow of cool gas, preferably hydrogen but in any case an inert gas, a gas non-oxidizing to copper and steel, or one which is reducing with respect to copper or iron oxide.

In the apparatus designed for the most efficient operation and practice of the present method, the gas in the pipe is circulated at high velocity in a closed path which includes heat exchange means so that gas contacting the brazed tubing and operating to cool the same is always at a relatively cool temperature.

After the brazed tubing has been cooled to a non-reactive temperature it may be brought to room temperature by subjecting it to a water spray.

Referring now to the drawings, the apparatus for forming the strip into tubular form is illustrated at 10 and includes final rolls 11 driven by suitable motor means 12. These rolls are of conventional form and are not illustrated in detail herein. At this time it may be noted that at the opposite end of the apparatus the brazed and cooled tube is in engagement with rolls 14 driven by motor means indicated generally at 16.

In order to insure that the tubing during its transit through the apparatus is maintained under tension so as to avoid any possibility of kinking or the like, the motor means 12 and 16 are operated at a speed which produces a continuous relatively small elongation of the tubing. For this purpose it is preferred to employ direct current motors having separately adjustable fields with speed control effected by change in voltage. Thus, voltage change effects simultaneous corresponding change in speed of both motors without disturbing the previously adjusted relative rates which produce the desired elongation.

In order to bring the tubing to brazing temperature in the very short interval of time which is required to traverse the inductor, a relatively powerful transformer is required. This transformer is indicated diagrammatically at 18 and is connected to the inductor means 20 which will be described in considerable detail subsequently. It is noted however, that the transformer and inductor means are sufficiently powerful to bring the tubing to brazing temperature while it is being advanced at a rate of approximately 150 feet per minute, or higher.

After the tubing has been brought to brazing temperature, at which time the brazing operation is complete, it is advanced through the cooling pipe 22 through which the cooling gas is circulated at a sufficiently high velocity to produce a definite turbulent flow with resulting efficient transfer of heat from the brazed tubing to the gas.

The flow of the cooling gas is carried out by a blower 24 driven by motor means indicated generally at 26, and discharging the cooled gas through a T-coupling 28 through branch passages 30 and 32 to the pipe 22. From the points of connection of the lines 30 and 32 the cooled gas flows outwardly and returns through connections illustrated at 34 and 36 respectively, and thence through lines 38 and 40 to the heat exchanger 42. The heat exchanger may conveniently include water cooled finned tubing over which the heated gas is passed and from which it is drawn by the blower 24.

The system is at all times maintained under positive pressure so as to prevent entry of oxygen or atmosphere into the pipe 22.

The gas may be hydrogen or a mixture of hydrogen and nitrogen from cracked $NH_3$, or a mixture of carbon monoxide, hydrogen and nitrogen obtained from partial combustion of natural gas or other atmosphere suitable for brazing. In any case, make-up gas will be available and supplied to the system to maintain the closed gas circulating system under positive pressure.

Reference has been made to the relatively high velocity of the cooling gas in the pipe 22 and the turbulence which results from the high velocity. It is found that when the gas velocity is sufficient to insure a turbulent flow, heat transfer from the hot brazed tubing to the gas is at a much higher rate than if the flow is relatively non-turbulent or laminar. By way of example, the blower is operated at a rate sufficient to induce a flow of gas in the cooling pipe 22 on the order of 100 miles per hour, which when the pipe 22 is a 4 inch pipe, produces the turbulent flow which results in cooling the brazed tubing relatively quickly.

With reference to turbulent flow the following quotation is taken from "The Mechanics of Turbulent Flow," by Bakhmeteff, Princeton University Press, 1941, page 10:

"The nearest picture describing turbulence is to view the basic flow, contributing to the regular mass discharge, as being complemented by an infinite sequence of secondary motions, in the form of vortices or otherwise, which seemingly without any constant pattern are being generated at different points of the streaming. All these innumerable disturbances add and supplement each other so at any chosen point of the fluid continuum in addition to the basic average velocity, there is the combined influence of a multitude of individual and perhaps independent vortices or seconding currents, the sum total of which determine the actual velocity and the other elements of flow at a certain moment, only to be replaced at the next moment by the combined effect of a series of new agencies which in their turn amalgamate to bring about a new resultant, differing from the previous velocity in size and direction."

From the same text, on page 13 appears the following:

"Reynolds showed that whether fluid motion in a pipe was to be in 'laminar' or 'turbulent' state, depended on the numerical value of a certain dimensionless characteristic.

$$Re = \frac{DVo}{u}$$

D=diameter
V=velocity
o=density
u=viscosity

It has been experimentally established that in the case of pipes for values of $Re$ less than 2000–2100, the stable form of motion is always laminar .... Thus a velocity criterion termed the 'lower critical velocity' is established representing an average velocity of flow, below which in a pipe of given diameter and with a given viscosity, fluid will always move in laminar fashion .... The fact stands nevertheless that above $Re=2000$ streamline flow is not inherently stable so that any disturbance, once started, rapidly tends to disintegrate the laminar pattern into inordinate mixing."

The term "$Re$" is the Reynolds number and assuming the diameter of the cooling pipe 22 in the present case to be 4 inches (which is a suitable value), assuming the velocity to be 100 miles per hour (or 130 feet per second), using values for the density and viscosity of the gas at an average temperature of 100 degrees centigrade, we arrive at a Reynolds number of very approximately 2650 which is seen to be substantially above the 2000 or 2100 value said to produce unstable flow of turbulence.

By the time the tubing emerges from the nozzle 44 of the cooling pipe 22 it is sufficiently cool so that it may thereafter be cooled to room temperature by subjecting it to water spray from water nozzles 46 carried by a header 48.

At intervals along the cooling pipe 22, as best seen in Figures 10 and 11, there are provided means for supporting the brazed tube T. Conveniently, this is accomplished by inserting T-couplings 50 having removable covers 52 provided with openings 54 normally closed by a rupturable sealing diaphragm 56. This is a safety device which permits rupture of the diaphragm 56 in the event of an explosion occurring within the pipe 22.

The cover 52 is carried by an arm 58 adapted to be swung into and out of closing position by a lever 60.

Depending downwardly from an intermediate support element 53 is a post 62 which as best seen in Figure 11, includes a frame 64 at its lower end supporting opposed pairs of rolls 66. As seen in this figure, the rolls 66 are each disposed at an angle of approximately 45 degrees with respect to the horizontal so that the weight of the tube T is carried by the two lowermost rolls and it is maintained in contact with these rolls by the upper rolls. Element 53 has openings 67 registerable with openings 54 and which, when diaphragm 56 and cover 52 are removed, permit access to the pipe for threading the tube through the guide members.

Insofar as the rapid cooling of the brazed tubing by subjecting it to high velocity turbulent flow of an inert or non-reactive or reducing gas is concerned, it will be appreciated that the manner in which the brazed tubing was brought to brazing temperature is immaterial. However, in the complete apparatus and method it is preferred to employ induction heating intermediate the forming rolls and the cooling apparatus since this may be most conveniently applied.

The induction heating apparatus is shown in detail in Figures 3–9. Essentially, the induction heating apparatus is designed to concentrate flux in the portion of the tube where the brazed joint is located and to effect rapid heating of this portion of the tube to brazing temperature with the possibility that the remaining portion of the tube will be brought to a temperature less than brazing temperature. The inductor comprises bus bars 70 and 72 separated by an insulating plate 74 which as is apparent from Figures 3 and 4, extends outwardly beyond adjacent edges of the bus bars to prevent flashover. The power source connected to the bus bars 70 and 72 may be of conventional form but is intended to produce high frequency current as for example, approximately 10,000 cycles. This high frequency current, in accordance with well understood principles, is concentrated at the surface of the conductor and advantage is taken of this characteristic to concentrate flux in a novel manner relative to the advance of the tube.

The bus bar 72, as best seen in Figure 5, divides at its upper ends and includes upwardly extending arms 75 and 76 each provided with laterally extending ears 77. In order to retain the bus bars 70 and 72 in assembled relation with the interposed insulating plate 74, nuts and bolts indicated generally at 78 are provided, these bolts including insulation in the usual form in order to prevent the bolts from forming electrical connections between the bus bars.

Connected to the arms 75 and 76 are electrical conductors 80 and 82 respectively both in the form of copper tubing of rectangular cross-section and adapted to contain cooling water which is circulated therethrough. Conductors 80 and 82 join a longitudinal main conductor 84 which extends longitudinally of the inductor and at the opposite end connects to branches 86 and 88 which are electrically connected to upwardly extending arms 90 and 92 of the bus bar 70. A suitable flow of cooling water is maintained in the tubular conductors by means of Y-connections 94 and 96 connected respectively to supply and discharge conduits 98 and 100.

The main conductor or conducting tube 84, as best illustrated in Figure 4, is supported adjacent its ends by blocks 102 and 104, and intermediate its ends by blocks 106 and 108. Intermediate the adjacent blocks the conducting tube 84 is surrounded by the iron laminations 110 forming a magnetic core or yoke. Extending longitudinally of the conductor is a passage for the tube T and this is formed by chambers 112 in the blocks having registering openings in opposite sides thereof and adapted to be closed by removable covers 114. Intermediate adjacent blocks there is a relatively small pipe 116 which may be formed of ceramic material and which contains or envelops the tube T in spaced relationship thereto, during its transfer through the inductor. Within the chambers 112 and the blocks are provided spaced rollers 118′ which in turn have arcuate channels receiving and guiding the tube T.

The main conductor or conducting tube 84 of the inductor has ears 118 struck up from its bottom wall intermediate adjacent ones of the blocks 102, 104, 106 and 108 and these ears provide openings 120 through which the cooling liquid flows. Overlying the openings 120 and extending downwardly from the lower wall of the tubular conductor 84 are flux deflectors 122 which form a passage for the cooling fluid and which include lower portions 124 extending into close proximity to the ceramic pipe 116.

Due to the phenomenon of surface conduction of high frequency current, the alternating current carried by the tubular conductor 84 will pass along the surface of the flux deflectors 122 where it is in close proximity to the brazed tube contained within the ceramic supporting pipe sections 116. Moreover, the tube T is advanced through the supporting pipe sections 116 and between the rollers 118′ in such a way that the brazed joint therein is uppermost or in the closest proximity to the lower surface of the flux deflectors 122. As a result of this the flux which surrounds the conductor 84 and which is concentrated generally in the iron laminations 110 intercepts the ceramic pipe 116 between the end portions 126 of the laminations 110 but more particularly, are concentrated across the upper side of the ceramic pipe and of the brazed tubing therein.

As a result of the foregoing, observations indicate that the upper surface of the brazed tube where the brazed joint is located may be brought to a white heat while the remaining portion of the tube remains at a red heat.

The design of the inductor herein disclosed is intended and effective to produce substantially only magnetic flux in the region of the tube T in a direction transverse to the axis of said tube. It is imperative to minimize or avoid axal components of alternating magnetic flux which would induce currents to circulate around the wall of tube T and across the unbrazed lap joint; since the electrical resistance of the control across the lap joint is rather high and quite variable and erratic due to gauge irregularities in the material or variable surface film conditions. Said resistance variations would cause corresponding uncontrolled variations in heating at the lap region.

Since a relatively large amount of energy is required to bring the tube to brazing temperature in the short interval permitted, it has been found desirable to provide additional cooling for the inductor. As best illustrated in Figures 8 and 9, the bus bars 72 are provided with cooling tubes 130 connected to a circulating system including conduits 132 and 134. Means are also provided for cooling the blocks and laminations of the inductor and the end blocks 102 and 104 include bored passages 136 connected to conduits 138 for cooling fluid. In Figure 6 the end block is assumed to be the block 102 and the conduit 138 may be considered as an inlet conduit although the relationship may of course be reversed. Each of the blocks 102, 104, 106 and 108 are provided with horizontally extending fluid passages 140 which are in alignment in assembly, and the conduits 140 are four in number arranged in two vertically spaced pairs. Each vertically spaced pair of conduits in the end blocks are connected by vertically extending passages 142 which communicate with the passage 136.

The laminations 110 are provided with openings 144 and 146 which register with the passages 140 in the several blocks. When the laminations are assembled together with suitable binding material and baked, the assembly of laminations together with the passages 140 through the blocks define four parallel passages through the central part of the inductor which extend longitudinally from one end block to the other.

The drawings and the foregoing specification constitute a description of the improved method and apparatus for induction brazing metal tubing in such full, clear, concise and exact terms as to enable any person skilled in the art to practice the invention, the scope of which is indicated by the appended claims.

What I claim as my invention is:

1. The method of effecting rapid cooling of continuous brazed tubing immediately following progressive brazing thereof which comprises advancing the hot continuous tubing longitudinally through an elongated pipe while maintaining through the pipe an essentially axial flow of cooled inert gas at a rate inherently insuring turbulent flow therein.

2. The method of effecting rapid cooling of continuous brazed tubing immediately following progressive brazing thereof which comprises advancing the hot continuous tubing longitudinally through an elongated pipe while maintaining through the pipe an essentially axial flow of cooled inert gas at a rate of at least 100 feet per second to insure inherent turbulent flow therein.

3. The method as defined in claim 2 which comprises advancing the tubing at a rate of at least 100 feet per minute.

4. The method of completing a tube brazing operation by bringing the heated tube to a non-reactive temperature which comprises advancing the hot tubing through a pipe having an inert cooling gas therein, and circulating the gas longitudinally of the pipe at a velocity of at least 100 feet per second to insure turbulent flow thereof.

5. The method of completing a tube brazing operation by bringing the heated tube to a non-reactive temperature which comprises advancing the hot tubing at relatively high speed through a pipe having an inert cooling gas therein, and circulating the gas longitudinally of the pipe at a velocity of at least 100 feet per second to insure turbulent flow thereof.

6. The method as defined in claim 5 in which the direction of gas flow in the section of the pipe first traversed by the tubing is counter to the direction of movement of the tubing.

7. The method as defined in claim 5 which comprises introducing the gas into the pipe intermediate its ends and exhausting gas from the pipe adjacent the ends thereof.

References Cited in the file of this patent

UNITED STATES PATENTS

| | | |
|---|---|---|
| 810,865 | Hoover et al. | Jan. 23, 1906 |
| 1,131,609 | Magron | Mar. 9, 1915 |
| 2,009,078 | Ziska | July 23, 1935 |
| 2,217,452 | Peck | Oct. 8, 1940 |
| 2,449,220 | Gupton | Sept. 14, 1948 |
| 2,553,925 | Lucas | May 22, 1951 |
| 2,654,822 | Agule | Oct. 6, 1953 |
| 2,668,510 | Mally | Feb. 9, 1954 |
| 2,715,170 | Sorensen | Aug. 9, 1955 |
| 2,715,171 | Williamson | Aug. 9, 1955 |
| 2,716,689 | Body | Aug. 30, 1955 |

OTHER REFERENCES

Chemical and Engineering News, vol. 25, No. 23, June 9, 1947, page 1690.